Dec. 28, 1926.
E. M. HEWLETT ET AL
1,612,119
SYSTEM FOR THE TRANSMISSION OF ANGULAR MOTION
Original Filed Nov. 22, 1924
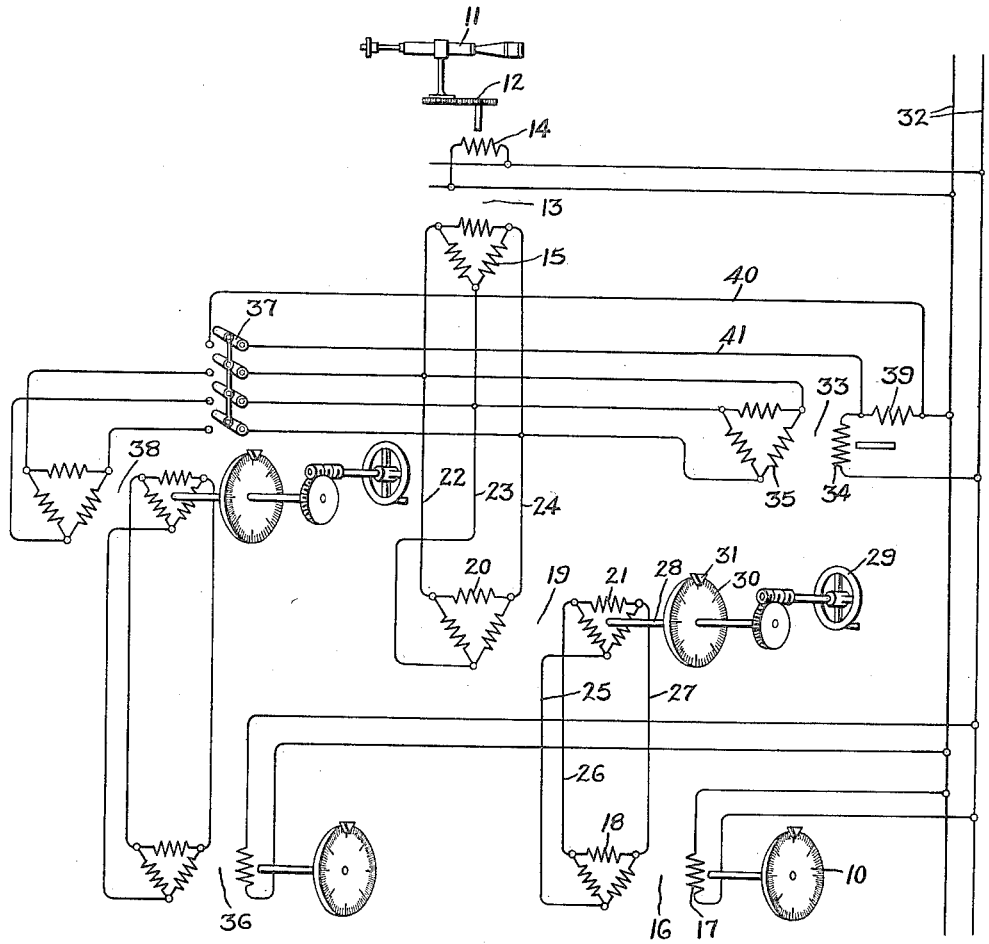
Inventor:
Edward M. Hewlett,
Waldo W. Willard,
by
His Attorney.

Patented Dec. 28, 1926.

1,612,119

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

SYSTEM FOR THE TRANSMISSION OF ANGULAR MOTION.

Application filed November 22, 1924, Serial No. 751,714. Renewed July 30, 1926.

Our invention relates to systems for the transmission of angular motion and has for its object the provision of means for supplying the excitation energy required for various inductive devices in such systems.

More specifically our invention relates to systems for the transmission of angular motion in which transmitting and receiving devices of the alternating current type are used and in which an exciting device is provided for supplying the excitation energy for various inductive devices in the system. In this manner the transmitting and receiving devices are relieved of the excitation load for other inductive devices in the system, and may be themselves excited by the exciter, whereby the size of the transmitting and receiving devices may be appreciably reduced. Such a system is described and claimed in a co-pending application of Lee E. Hildebrand, Serial No. 522,650, filed December 15, 1921, and assigned to the same assignee as this invention. It is sometimes desired to connect additional receiving devices, in which case the exciter may not supply the excitation energy required due to a decrease in its voltage upon the increase in load.

In accordance with our present invention we provide means whereby the voltage of the exciter may be increased concurrently with the connection of another receiving device to the system or decreased when a receiving device is disconnected in such manner that the exciter supplies the required excitation energy.

For a more complete understanding of our invention reference should be had to the accompanying drawing in the single figure of which is shown in diagrammatic fashion a system for the transmission of angular motion embodying our invention.

Referring to the drawing, we have shown our invention in one form as applied to the driving of a remotely situated indicating device, shown as a dial 10, in response to the angular movements of a telescope 11 or other object in a predetermined plane, such as a horizontal plane. Connected to the telescope through suitable gearing 12 is a motion transmitting device 13. This transmitting device is provided with a field winding 14, preferably mounted on the rotor, and a polycircuit armature winding 15 on its stator shown as physically similar to a three phase delta connected armature winding. The dial 10 is driven by a receiving device 16 similar in construction to the transmitting device 13, having a single circuit field winding 17 and a polycircuit armature winding 18. The dial may be secured to the rotor shaft of the receiving device.

Like points of the two armature windings 15 and 18 are electrically connected together, and as shown a differential device for introducing corrections may be interposed in these connections. This differential device may comprise inductively associated polycircuit windings 20 and 21, winding 20 being connectd to winding 15 through conductors 22, 23 and 24, while winding 21 is connected to winding 18 through conductors 25, 26 and 27. One of the windings of the differential device is rotatably mounted. As shown, winding 21 is rotatable by means of a shaft 28 on which it is mounted. The shaft 28 may be turned by the hand wheel 29. A dial 30 is provided on the shaft 28, and a cooperating stationary pointer 31 is provided whereby corrections can be accurately introduced. The field windings 14 and 17 are connected to a suitable source of alternating current supply 32.

In the operation of transmitting and receiving devices of this character, the field windings induce electromotive forces in the circuits of the armature windings, the relative values and directions of these electromotive forces varying in accordance with the the relative angular position of the field winding. When the two rotors are in corresponding angular positions the electromotive forces induced in the armature windings are respectively equal and opposite to each other, and since like points of the two windings are connected, the electromotive forces are also in opposition to each other and consequently no currents are set up. Upon rotation of the field winding of the transmitter, however, a new set of electromotive forces is induced in the armature circuits of the transmitter and as a result the electromotive forces of the two devices become unbalanced and currents are set up. This results in a torque being applied to the rotor of the receiver whereby it is turned to a position in which the electromotive forces again balance, this position corresponding to that of a transmitter.

When the two windings of the differential device 19 are in corresponding angular positions the differential device has no effect on the set of electromotive forces transmitted through it from the transmitter. By turning winding 21 by means of hand wheel 29 the differential device is caused to transmit a different set of electromotive forces i. e. the set of electromotive forces induced in winding 21 and applied to the receiving device will be different from the set impressed on winding 20 by the transmitting device. This change in the set of electromotive forces is proportional to the amount of angular displacement of winding 21, and any desired changes or corrections may thereby be introduced in the position of the dial 10 independently of the transmitting device. Obviously, the differential device may or may not be used as determined by the conditions of operation.

For supplying the excitation energy for the inductive devices in the system, an auxiliary receiving device 33 similar in construction to the transmitting device 13 is provided. The field winding 34 of this device is connected to the supply source 32, while its armature winding 35 is connected to the conductors 22, 23 and 24, i. e., between the transmitting device and the differential device 19. The rotor of this auxiliary device is free and it consequently assumes the position of the transmitting device. If desired it may be connected to the conductors 25, 26 and 27, i. e., between the differential device 19 and the receiving device.

When the exciting device 33 is connected, as shown between the transmitting device and the differential device 19, its voltage characteristics are preferably such that its no-load voltage is slightly greater than that of the transmitting device. When it is connected between the differential device and the receiving device 16, its voltage characteristics are preferably such that its no-load voltage is slightly higher than that of the receiving device. This excess in voltage is of such value that when the exciting device is supplying exciting current for the differential device, the drop in its voltage caused by its own impedance is just sufficient to decrease its voltage to the no-load voltage of that part of the system to which it is connected. The exciting device thus supplies the exciting current for the differential device, relieving the transmitting and receiving devices of this load.

When it is desired to further reduce the size of the transmitting and receiving devices, the exciting device may be arranged to have a slightly higher no-load voltage such that it will supply the excitation energy for the transmitting device, when connected as shown in the drawing, or for the receiving device when connected between the receiving device and the differential device, and it may be used for this purpose whether the system includes a differential device 19 or not.

It is sometimes desirable at certain times to operate more than one receiving device from a single transmitter. To do this it is necessary to connect the additional receiving devices to the transmitter through a suitable switch. As shown the receiving device 36, similar in construction to the transmitting device 13, may be connected to the transmitter 15 by means of a switch 37. A differential corrective device 38, similar to the device 19, may be included in the circuit with the receiver 36. When the receiving device 36 is connected it will be observed that the exciter 33 will be called upon to furnish excitation energy for both differential devices 19 and 38 and consequently its load will be doubled. This results in a decrease in the voltage of the exciter by reason of its drooping voltage characteristic, and consequently the exciter does not supply the required amount of energy.

In accordance with our invention we provide means for increasing the voltage of the exciter when an additional receiving device is connected. For example we may connect an inductance coil 39 in series with the field coil 34 of the exciter and construct the exciter so that its voltage is of such value that it supplies the normal excitation load with the inductance coil connected. This coil 39 may be short-circuited by means of a circuit through conductors 40 and 41, which circuit is closed by switch 37 concurrently with the connection of the receiver 36. By cutting out this inductance when the additional load is connected, the voltage of the exciter is increased to such a value that it carries the total excitation load.

While we have described our invention as embodied in concrete form and as operating in a specific manner in accordance with the provisions of the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States is:—

1. A system for the transmission of angular motion comprising a plurality of inductive devices including a motion transmitting device and a motion receiving device, means for supplying the excitation energy for at least one of said inductive devices, a second receiving device, and means for connecting said second receiving device to said transmitting device and for concurrently therewith increasing the voltage of said exciting means.

2. A system for the transmission of angular motion comprising an induction transmitting device, a receiving device connected thereto, a second receiving device connected to said transmitting device arranged to act as an exciter, a third receiving device, and means for connecting said third receiving device to said transmitting device and for concurrently therewith increasing the voltage of second receiving device.

3. A system for the transmission of angular motion comprising an electrical motion transmitting device, an electrical motion receiving device connected to said transmitting device, an inductive device interposed between said transmitting and receiving devices for controlling the angular relation thereof, means for supplying the excitation energy for said inductive device, a second receiving device, a second inductive device connected to said second receiving device, and means for connecting said second inductive device to said transmitting device and for concurrently therewith increasing the voltage of said exciting means.

4. A system for the transmission of angular motion comprising an electrical motion transmitting device, an electrical motion receiving device, electrical connections between said devices, inductively cooperating relatively movable windings interposed in said connections for changing the angular relation of said devices, exciting means for said windings, a second motion receiving device, connections including a second set of relatively movable windings whereby said second receiving device may be connected to said transmitting device, and means for increasing the voltage of said exciting means concurrently with the connection of said second receiving device.

5. A system for the transmission of angular motion comprising a transmitting device and a plurality of receiving devices, said devices having armature and field windings, a source of alternating current supply for said field windings, connections between the armature winding of said transmitting device and the armature windings of said receiving devices, one of said receiving devices being arranged to operate as an exciter to supply exciting current for at least one of said other devices, a reactance coil normally in the field circuit of said exciter, a normally disconnected receiving device, and switching means for connecting said latter receiving device to said transmitting device and for concurrently therewith short-circuiting said reactance coil.

6. A system for the transmission of angular motion comprising a transmitting device and a receiving device each having armature and field windings, a second receiving device having similar windings, connections between the armature windings of said devices, a source of alternating current supply connected to said field windings, said second receiving device being arranged to supply exciting current for at least one of said devices, a third receiving device having an armature winding and a field winding, connections between said latter field winding and said supply source, electrical connections including a switch whereby the armature winding of said third receiving device may be connected to the armature winding of said transmitting device, a reactance coil normally in circuit with the field winding of said auxiliary device, and connections whereby when the armature winding of said third receiving device is connected to said transmitting device said reactance coil is short-circuited.

7. A system for the transmission of angular motion comprising a motion transmitting device and a motion receiving device each having polycircuit armature and single circuit field windings, a second receiving device having similar windings, connections between the armature windings of said devices, a source of alternating current supply connected to said field windings, inductively cooperating polycircuit windings interposed in the connections between said armature windings, one of said polycircuit windings being rotatable to adjust said first receiving device independently of said transmitting device, said second receiving device being arranged to supply the exciting current for said cooperating windings, a third receiving device, a second set of polycircuit windings for adjusting said third receiving device independently of said transmitting device, a reactance coil in the field circuit of said exciter, and switching means for connecting said third receiving device to said transmitting device and for concurrently therewith short-circuiting said reactance coil.

In witness whereof, we have hereunto set our hands this 21st day of November, 1924.

EDWARD M. HEWLETT.
WALDO W. WILLARD.